(12) United States Patent
Solinas (10) Patent No.: US 7,062,043 B1
(45) Date of Patent: *Jun. 13, 2006

(54) METHOD OF ELLIPTIC CURVE DIGITAL SIGNATURE USING COEFFICIENT SPLITTING

(75) Inventor: Jerome A. Solinas, Westminster, MD (US)

(73) Assignee: The United States of America as represented by the National Security Agency, Washington, DC (US)

( * ) Notice: Subject to any disclaimer, the term of this patent is extended or adjusted under 35 U.S.C. 154(b) by 938 days.

This patent is subject to a terminal disclaimer.

(21) Appl. No.: 10/185,805

(22) Filed: Jun. 28, 2002

(51) Int. Cl.
  *H04K 1/00* (2006.01)
  *H04L 9/00* (2006.01)
  *G06F 7/38* (2006.01)

(52) U.S. Cl. ............................ 380/30; 380/44; 708/490
(58) Field of Classification Search ................ None
  See application file for complete search history.

(56) References Cited

U.S. PATENT DOCUMENTS

| | | | |
|---|---|---|---|
| 4,200,770 A | 4/1980 | Hellman et al. | |
| 4,405,829 A | 9/1983 | Rivest et al. | |
| 4,995,082 A | 2/1991 | Schnorr | |
| 5,231,668 A | 7/1993 | Kravitz | |
| 5,497,423 A | 3/1996 | Miyaji | |
| 5,581,616 A | 12/1996 | Crandall | |
| 5,600,725 A | 2/1997 | Rueppel et al. | |
| 5,604,805 A | 2/1997 | Brands | |
| 5,606,617 A | 2/1997 | Brands | |
| 5,761,305 A | 6/1998 | Vanstone et al. | |
| 6,212,279 B1 | 4/2001 | Reiter et al. | |
| 6,490,352 B1 * | 12/2002 | Schroeppel | 380/30 |
| 6,618,483 B1 * | 9/2003 | Vanstone et al. | 380/30 |
| 6,778,666 B1 * | 8/2004 | Kuzmich et al. | 380/28 |
| 6,782,100 B1 * | 8/2004 | Vanstone et al. | 380/28 |
| 6,898,284 B1 * | 5/2005 | Solinas | 380/28 |

(Continued)

OTHER PUBLICATIONS

Karpynskyy et al, "Elliptic Curve Parameters Generation", Feb. 2004, TCSET '2004, p. 294-295.*

(Continued)

*Primary Examiner*—Christopher Revak
(74) *Attorney, Agent, or Firm*—Robert D. Morelli (57) ABSTRACT

A method of generating and verifying a cryptographic digital signature using coefficient splitting. The digital signature is formed by first selecting a finite field, an elliptic curve of a first type or a second type, a point P, an integer $w_1$, and an integer $k_1$. Next, generating, via coefficient splitting, a point $W=w_1P$ and a point $K=k_1P$. Next, transforming, K to a bit string $K^*$. Next, combining $K^*$, W, and a message M in a first manner to produce $h_1$, and in a second manner to produce c. Next, generating s be either $s=h_1w_1+ck_1 \pmod q$, $s=(h_1w_1+c)/k_1 \pmod q$, or $s=(h_1k_1+c)/w_1 \pmod q$. Next, forming the cryptographic digital signature as $(K^*,s)$. The digital signature is verified by acquiring the finite field, the elliptic curve, the point P, the point W, the message M, and the cryptographic digital signature $(K^*,s)$. Next, computing $h_1$ and c. Next, selecting $(n_0, n_1)$ from $(sc^{-1} \pmod q, -h_1c^{-1} \pmod q)$, $(cs^{-1} \pmod q, h_1s^{-1} \pmod q)$ or $(-ch_1^{-1} \pmod q, sh_1^{-1} \pmod q)$. Next, generating the point $n_0P$ via coefficient splitting. Next, generating the point $n_1W$ via coefficient splitting. Next, summing the points computed in the last two steps and designating the sum Q. Next, transforming Q to $Q^*$. Lastly, verifying the digital signature $(K^*,s)$ if $Q^*=K^*$. Otherwise rejecting the cryptographic digital signature $(K^*,s)$ as unverified.

18 Claims, 3 Drawing Sheets

U.S. PATENT DOCUMENTS 6,993,136 B1 * 1/2006 Solinas ..................... 380/278

OTHER PUBLICATIONS

Menezes et al, "Reducing Elliptic Curve Logarithms to Logarithms in a Finite Field", 1991, ACM, p. 80-89.*

Menezes, "Elliptic Curve Public Key Cryptosystems", 1993, Kluwer Academic Publishers, p. 13-34.*

Enge, "Elliptic Curves and Their Applications to Cryptography, An Introduction", 1999, Kluwer Academic Publishers, p. 125-152.*

Rosing, "Implementing Elliptic Curve Cryptography", 1999, Manning Publications Co., p. 129-163.*

Francois Morain, Jorge Olivos, "Speeding Up The Computations on An Elliptic Curve Using Addition-Subtraction Chains," Theoretical Informatics & Appls. vol. 24 No. 6 1990, pp. 531-544.

Chae Hoon Lim, Pil Joong Lee, More Flexible Exponentiation with Precomputation; Crypto '94, Springer-Verlag, 1994, pp. 95-107.

R. Gallant, R. Lambert, S. Vanstone, "Faster Point Multiplication on Elliptic Curves with Efficient Endomorphisms," Centre For Applied Cryptographic Research, Corr-20000-53, 2000.

Laurie Law, Alfred Menezes, Minghua Qu, Jerry Solinas, Scott Vanstone, "An Efficient Protocol for Authenticated Key Agreement" Copp-98-05, Dept. of C & O Univ. of Waterloo Canada 1998.

* cited by examiner

METHOD OF ELLIPTIC CURVE DIGITAL SIGNATURE USING COEFFICIENT SPLITTING

FIELD OF THE INVENTION

This invention relates to cryptography and, more particularly, to the generation and verification of a discrete logarithm based digital signature on an elliptic curve using coefficient splitting.

BACKGROUND OF THE INVENTION

The field of cryptography has spawned numerous devices and methods such as scramblers, symmetric-key encryptors, and public-key encryptors.

A scrambler is a device that receives an unencrypted message (i.e., plaintext) and produces an encrypted message (i.e., ciphertext). The encryption function of a scrambler is fixed in hardware and does not change from message to message. One of the problems with a scrambler is that the same plaintext will produce the same ciphertext. An adversary may collect ciphertext messages from a particular scrambler and compare them against each other in order to analyze a particular ciphertext message. To overcome this problem, the users may change the function of the scrambler periodically. Such a solution is time consuming and expensive.

Another solution to the problem associated with a scrambler is symmetric-key encryption. A symmetric-key encryptor has two inputs (i.e., plaintext and a cryptographic key). A cryptographic key is a message, or number, that should appear random to an adversary. A symmetric-key encryptor combines the cryptographic key with the plaintext using a scrambling function in order to generate ciphertext. The same plaintext may produce different ciphertext if the cryptographic key is changed. Since the cryptographic key is a message, or a number, it is much easier to change than the function of the scrambler which is built into hardware. In fact, the cryptographic key may be changed on a message-to-message basis without much difficulty. This method is called symmetric-key encryption because the intended recipient must possess the cryptographic key used to generate the ciphertext in order to recover the plaintext. The intended recipient must also possess a function that performs the inverse of the scrambling function used to generate the ciphertext. Typically, the inverse of the scrambling function may be achieved by operating the scrambling function in reverse. If this is the case, the intended recipient must possess the same cryptographic key and scrambling function used to generate the ciphertext in order to recover the plaintext.

Even though symmetric-key encryptors make the fastest encryptors, they suffer from a few problems. The first problem is distributing cryptographic keys to authorized users in a secure fashion. A courier may be required to deliver the first cryptographic key to the users. This is time consuming and expensive. The second problem is knowing whether or not ciphertext came from a particular person. Anyone knowing the cryptographic key may encrypt or decrypt a message produced using a symmetric-key encryptor as long as they know the cryptographic key, the scrambling function, and the descrambling function.

U.S. Pat. No. 4,200,770, entitled "CRYPTOGRAPHIC APPARATUS AND METHOD," discloses a device for and method of performing a cryptographic key exchange over a public channel. The method is often called a public-key key exchange method or the Diffie-Hellman key exchange method after the first two named inventors of U.S. Pat. No. 4,200,770. The Diffie-Hellman key exchange method uses the exponentiation function to allow two users to conceal and transmit their secret information to the other user. The users then combine what they received with their secret information in order to generate the same cryptographic key. To recover the secret information that was transmitted and construct the cryptographic key, an adversary would have to find the logarithm of what was transmitted. If the values involved are large enough the logarithm, or discrete log, problem is believed to be intractable. U.S. Pat. No. 4,200,770 is hereby incorporated by reference into the specification of the present invention. The Diffie-Hellman key exchange method offers a solution to the symmetric-key key distribution problem, but it does not solve the problem of verifying the identity of the sender of the ciphertext.

Asymmetric-key, or public-key, encryption was proposed as a solution to identifying the sender of the ciphertext. This problem is often referred to as being able to provide, and verify, a digital signature. Two different, but mathematically related, cryptographic keys are used in asymmetric-key, or public-key, encryption. Typically, a first, or secret, key is used to generate ciphertext while a second, or public, key is used to recover the plaintext. Each user possesses their own secret key and mathematically related public key. Each user keeps their secret key secret and makes their public key public. A first user may now generate ciphertext using their secret key and a second user may recover the corresponding plaintext using the corresponding public key. If the first user is the only person who knows the first user's secret key then the second user is assured that the ciphertext came from the first user.

In the example just given, anyone knowing the first user's public key, which is everyone, could recover the corresponding plaintext. If two users wish to communicate securely with some assurance that the message is from a particular person, the first user would encrypt the plaintext using the first user's secret key then the intended recipient's public key to encrypt the ciphertext and something to identify the first user. The recipient would then use their secret key to recover the ciphertext and the identification material. The identification material is then used to identify the public key of the first user. The first user's public key is then used to recover the plaintext. If the first user is the only one who knows the first user's secret key and the intended recipient is the only one who knows the recipient's secret key then the recipient is the only one who can recover the plaintext and is assured that the ciphertext came from the first user.

U.S. Pat. No. 4,405,829, entitled "CRYPTOGRAPHIC COMMUNICATIONS SYSTEM AND METHOD," discloses one type of public-key encryption device and method known as RSA after the three named inventors, Messrs. Rivest, Shamir, and Adleman. Although RSA uses exponentiation, an adversary is required to factor the product of two prime numbers used to generate the secret key from the chosen public key in order to recover plaintext. If the prime numbers are large enough, it is believed that the factoring problem is intractable. U.S. Pat. No. 4,405,829 is hereby incorporated into the specification of the present invention.

Taher ElGamal developed a public-key digital signature scheme based on the extended Euclidean algorithm. In this scheme, a first user generates a secret value x as the first user's secret key. The first user uses exponentiation to conceal the secret key and publishes the result (i.e., $y = g^x$ mod p) as the first user's public key. The first user then generates a random number k and uses exponentiation to conceal the random number (i.e., r=g^k mod p). The result r is one of two values that will be used as a signature for a message m from the first user. Next, the first user generates an equation that includes the message m, the secret key x, the random number k, the first half of the signature r, and a variable that represents the second half of the signature s (i.e., m=xa+ks (mod p−1)). The first user then solves the equation for s and transmits the message, the public key, and the two halves of the signature (i.e., r,s) to the recipient. The recipient, knowing p and g, checks to see if (y^r)(r^s) mod p=g^m mod p. If so, the recipient is assured that the transmission came from the first user.

The math associated with the ElGamal's digital signature scheme is complex and the digital signature is rather long. U.S. Pat. No. 4,995,082, entitled "METHOD FOR IDENTIFYING SUBSCRIBERS AND FOR GENERATING AND VERIFYING ELECTRONIC SIGNATURES IN A DATA EXCHANGE SYSTEM," discloses a method of generating a shorter digital signature in a secure manner that using different and less complex mathematics. U.S. Pat. No. 4,995,082 is hereby incorporated by reference into the specification of the present invention.

U.S. Pat. No. 5,231,668, entitled "DIGITAL SIGNATURE ALGORITHM," improves upon the digital signature of ElGamal by reducing the size of the digital signature but maintaining the mathematical complexity. U.S. Pat. No. 5,231,668 is hereby incorporated by reference into the specification of the present invention.

U.S. Pat. No. 5,497,423, entitled "METHOD OF IMPLEMENTING ELLIPTIC CURVE CRYPTOSYSTEMS IN DIGITAL SIGNATURES OR VERIFICATION AND PRIVACY COMMUNICATION"; U.S. Pat. No. 5,581,616, entitled "METHOD AND APPARATUS FOR DIGITAL SIGNATURE AUTHENTICATION"; U.S. Pat. No. 5,600,725, entitled "DIGITAL SIGNATURE METHOD AND KEY AGREEMENT METHOD"; U.S. Pat. No. 5,604,805, entitled "PRIVACY—PROTECTED TRANSFER OF ELECTRONIC INFORMATION"; U.S. Pat. No. 5,606,617, entitled "SECRET-KEY CERTIFICATES": and U.S. Pat. No. 5,761,305, entitled "KEY-AGREEMENT AND TRANSPORT PROTOCOL WITH IMPLICIT SIGNATURES," disclose either an elliptic curve version of the above-identified digital signature schemes or a different digital signature scheme. None of these elliptic curve digital signature schemes disclose a method of generating and verifying a digital signature such that the number of elliptic curve operations is minimizes as does the present invention.

The cryptographic strength of any method based on the Digital Signature Algorithm is based on the apparent intractability of finding a discrete logarithm, or discrete log, under certain conditions. In order for an adversary to recover concealed information, the adversary must be able to perform the inverse of exponentiation (i.e., a logarithm). There are mathematical methods for finding a discrete logarithm (e.g., the Number Field Sieve), but these algorithms cannot be done in any reasonable time using sophisticated computers if certain conditions are met during the construction of a transmission that conceals information (e.g., the numbers involved are large enough).

More precisely, the cryptographic strength of the Digital Signature Algorithm is based on the difficulty of computing discrete logs in a finite cyclic group. Mathematically, the discrete log problem is as follows. Let G be a finite cyclic group of order q, where g is a generator of G. Let r be a secret number such that 0<r<q. Given G, q, g, and g^r, where "^" denotes exponentiation, find r, where r is the discrete logarithm, or discrete log, of g^r. The discrete log problem is to find r.

In a Diffie-Hellman key exchange, two users (e.g., User A and User B) agree on a common G, g, and q. In practice, the most common choice for G is the integers mod n, where n is an integer.

Large digital signatures pose problems not only for the adversary but also for the users. Large digital signatures require large amounts of computational power and require large amounts of time in order to generate and use the digital signature. Cryptographers are always looking for ways to quickly generate the shortest digital signatures possible that meet the cryptographic strength required to protect the digital signature. The payoff for finding such a method is that cryptography can be done faster, cheaper, and in devices that do not have large amounts of computational power (e.g., hand-held smart-cards).

The choice of the group G is critical in a cryptographic system. The discrete log problem may be more difficult in one group and, therefore, cryptographically stronger than in another group, allowing the use of smaller parameters but maintaining the same level of security. Working with small numbers is easier than working with large numbers. Small numbers allow the cryptographic system to be higher performing (i.e., faster) and requires less storage. So, by choosing the right group, a user may be able to work with smaller numbers, make a faster cryptographic system, and get the same, or better, cryptographic strength than from another cryptographic system that uses larger numbers.

The classical choice for G in a digital signature scheme are integers mod n, where n is an integer as well. In 1985, Victor Miller and Neal Koblitz each suggested choosing G from elliptic curves. It is conjectured that choosing such a G allows the use of much smaller parameters, yet the discrete log problem using these groups is as difficult, or more difficult, than integer-based discrete log problems using larger numbers. This allows the users to generate a digital signature that has the same, or better, cryptographic strength as a digital signature generated from an integer G and is shorter than the integer-based digital signature. Since shorter digital signatures are easier to deal with, a cryptographic system based on a shorter digital signature may be faster, cheaper, and implemented in computationally-restricted devices. So, an elliptic curve Digital Signature Algorithm is an improvement over an integer-based Digital Signature Algorithm.

More precisely, an elliptic curve is defined over a field F. An elliptic curve is the set of all ordered pairs (x,y) that satisfy a particular cubic equation over a field F, where x and y are each members of the field F. Each ordered pair is called a point on the elliptic curve. In addition to these points, there is another point O called the point at infinity. The infinity point is the additive identity (i.e., the infinity point plus any other point results in that other point). For cryptographic purposes, elliptic curves are typically chosen with F as the integers mod p for some large prime number p (i.e., $F_p$) or as the field of 2^m elements (i.e., $F_2m$).

Multiplication or, more precisely, scalar multiplication is the dominant operation in elliptic curve cryptography. The speed at which multiplication can be done determines the performance of an elliptic curve method.

Multiplication of a point P on an elliptic curve by an integer k may be realized by a series of additions (i.e., kP=P+P+ . . . +P, where the number of Ps is equal to k). This is very easy to implement in hardware since only an elliptic adder is required, but it is very inefficient. That is, the number of operations is equal to k which may be very large.

The classical approach to elliptic curve multiplication is a double and add approach. For example, if a user wishes to realize kP, where k=25 then 25 is first represented as a binary expansion of 25. That is, 25 is represented as a binary number 11001. Next, P is doubled a number of times equal to the number of bits in the binary expansion minus 1. For ease in generating an equation of the number of operations, the number of doubles is taken as m rather than m−1. The price for simplicity here is being off by 1. In this example, the doubles are 2P, 4P, 8P, and 16P. The doubles correspond to the bit locations in the binary expansion of 25 (i.e., 11001), except for the 1s bit. The doubles that correspond to bit locations that are 1s are then added along with P if the 1s bit is a 1. The number of adds equals the number of 1s in the binary expansion. In this example, there are three additions since there are three 1s in the binary expansion of 25 (i.e., 11001). So, 25P=16P+8P+P.

On average, there are m/2 1s in k. This results in m doubles and m/2 additions for a total of 3 m/2 operations. Since the number of bits in k is always less than the value of k, the double and add approach requires fewer operations than does the addition method described above. Therefore, the double and add approach is more efficient (i.e., faster) than the addition approach.

While working on an elliptic curve allows smaller parameters relative to a modular arithmetic based system offering the same security, some of the efficiency advantage of smaller parameters is offset by the added complexity of doing arithmetic on an elliptic curve as opposed to ordinary modular arithmetic. For purposes of determining efficiency, elliptic doubles and elliptic additions are often grouped and considered elliptic operations. To gain even more efficiency advantages by going to elliptic curves, cryptographers seek ways to reduce the cost of an elliptic curve operation, or reduce the number of elliptic operations required. An elliptic curve method that requires fewer operations, or more efficiently executable operations, would result in an increase in the speed, or performance, of any device that implements such a method.

It is no more costly to do elliptic curve subtractions than it is to do elliptic curve additions. Therefore, a doubles and add approach to doing elliptic curve multiplication may be modified to include subtraction where appropriate. There are an infinite number of ways to represent an integer as a signed binary expansion. The negative 1s in a signed binary expansion indicate subtraction in a double/add/subtract method while the positive 1s in the signed binary expansion indicate addition in the double/add/subtract method. For example, 25 may be represented as an unsigned binary number 11001 (i.e., 16+8+1=25) or as one possible signed binary number "1 0-1 0 0 1" (i.e., 32−8+1=25).

In an article entitled "Speeding Up The Computations On An Elliptic Curve Using Addition-Subtraction Chains", authored by Francois Morain and Jorge Olivos, published in *Theoretical Informatics and Applications*, Vol. 24, No. 6, 1990, pp. 531–544, the authors disclose an improvement to the double-add-subtract method mentioned above by placing a restriction on the signed binary expansion that results in fewer elliptic additions being required to do an elliptic curve multiplication and, therefore, increase the performance (i.e., speed) of elliptic curve multiplication. Messrs. Morain and Olivos proposed generating a signed binary expansion such that no two adjacent bit locations in the signed binary expansion are non-zero (i.e., two 1s, irrespective of polarity, may not be next to each other). Such a signed binary expansion is called a nonadjacent form (NAF) of a signed binary expansion. It has been shown that a NAF signed binary expansion is unique (i.e., each integer has only one NAF signed binary expansion) and contains the minimum number of 1s, irrespective of polarity. By minimizing the 1s, the number of additions is minimized. The improvement proposed by Messrs. Morain and Olivos still requires m doubles but only requires an average of m/3 additions for a total of 4m/3 elliptic curve operations. This is less than the 3 m/2 elliptic curve operations required by the classical double and add method described above.

Further savings can be obtained by restricting oneself to specific curves chosen specially to possess properties that allow scalar multiplication to be carried out using fewer operations than is possible in the general case. In the case in which F is the field of 2^m elements, the best way to do this is to use reduced tau-adic expansions on a Koblitz curve as disclosed in U.S. Pat. No. 6,212,279, entitled "METHOD OF ELLIPTIC CURVE CRYPTOGRAPHIC KEY EXCHANGE USING REDUCED BASE TAU EXPANSION IN NON-ADJACENT FORM. However, the method of U.S. Pat. No. 6,212,279 does not provide the best method of minimizing the number of operations when the field is the set of integers (mod p) for some large prime number p. U.S. Pat. No. 6,212,279 is hereby incorporated by reference into the specification of the present invention.

The general approach of prior art methods is to express the desired result as the sum of two scalar multiples, i.e. to write nP in the form $n_0 P_0 + n_1 P_1$. The resulting expression is then evaluated by what is commonly referred to as twin multiplication. This is done via a double-add-subtract binary method using signed binary expansions of $n_0$ and $n_1$.

The above approach can be significantly less expensive than the ordinary addition-subtraction method, but the advantage is usually mitigated by extra computations needed to compute $n_0$, $n_1$, $P_0$, and $P_1$ from n and P. The precise cost of these computations depends on the specific method used to implement this approach.

Chae Hoon Lim and Pil Joong Lee, in an article entitled "More Flexible Exponentiation with Precomputation," *Crypto '94*, Springer-Verlag, 1994, pp. 95–107, disclose a method of finding $n_0$, $n_1$, and $P_0$. However, the method of Lim and Lee requires an auxiliary computation to determine the value of $P_1$. Because of this extra computation, the method of Lim and Lee is advantageous only when it is required to take more than one multiple of the same point P.

R. Gallant, R. Lambert, and S. Vanstone, in an article entitled "Faster Point Multiplication on Elliptic Curves with Efficient Endomorphisms," *Centre for Applied Cryptographic Research* technical research report CORR 20000-53, 2000, disclose a method of finding $P_0$ and $P_1$. However, the method of Gallant et al. requires an auxiliary computation to determine the value of $n_0$ and $n_1$. The efficiency of the method of Gallant et al. is reduced by having to compute $n_0$ and $n_1$.

The present invention, which is called coefficient splitting, does not require the extra computations of the methods of either Gallant et al. or Lim and Lee.

More complicated key agreement protocols called authenticated key agreement methods work as follows. The users agree in advance on a field F, a curve E, and a base point P of order q. User A generates a private key $w_a$ and a corresponding public key $W_a = w_a P$ and similarly user B generates a private key $w_b$ and a corresponding public key $W_b = w_b P$. User A generates a private key $r_a$ and a corresponding public key $R_a = r_a P$ and sends $W_a$ and $R_a$ to user B. Similarly, user B generates a private key $r_b$ and a corresponding public key $R_b = r_b P$ and sends $W_b$ and $R_b$ to user A. User A now combines the values $w_a$, $r_a$, $W_b$, and $R_b$ in a certain way to obtain a number $c_a$, and also combines the values $w_a$, $r_a$, $W_b$, and $R_b$ in a second way to obtain a number $g_a$, Similarly, user B combines the values $w_b$, $r_b$, $W_a$, and $R_a$ in a certain way to obtain a number $c_b$, and also combines the values $w_b$, $r_b$, $W_a$, and $R_a$ in a second way to obtain a number $g_b$. This is done in such a way that $c_a w_b + g_a r_b$ and $c_b w_a + g_b r_a$ are equal modulo q. User A now computes the shared secret value by evaluating $c_a W_b + g_a R_b$, and User B computes the same value by evaluating $c_b W_a + g_b R_a$. An example of such a protocol is the MQV algorithm disclosed in a paper by L. Law et al. entitled "An Efficient Protocol for Authenticated Key Agreement" in Technical Report COPP 98-05, Dept. of C&O, University of Waterloo, Canada, 1998.

SUMMARY OF THE INVENTION

It is an object of the present invention to generate and verify a cryptographic digital signature in a manner that minimizes the number of elliptic curve operations.

It is another object of the present invention to generate and verify a cryptographic digital signature in a manner that minimizes the number of elliptic curve operations using coefficient splitting.

The present invention is a method of generating and verifying a cryptographic digital signature using coefficient splitting in order to minimize the number of elliptic curve operations.

The first step of a first method of generating and verifying a cryptographic digital signature is selecting a finite field.

The second step of the method is selecting an elliptic curve from two classes of elliptic curves.

The third step of the method is selecting a point P, an integer $w_1$, and an integer $k_1$.

The fourth step of the method is generating a point $W = w_1 P$ via coefficient splitting.

The fifth step of the method of is generating a point $K = k_1 P$ via coefficient splitting.

The sixth step of the method is transforming K to a bit string K*.

The seventh step of the method is combining K*, W, and a message M in a first manner to produce $h_1$.

The eighth step of the method is combining K*, W, and the message M in a second manner to produce c.

The ninth step of the method is generating s using one of the following equations:

$$s = h_1 w_1 + c k_1 \pmod{q},$$

$$s = (h_1 w_1 + c)/k_1 \pmod{q}, \text{ and}$$

$$s = (h_1 k_1 + c)/w_1 \pmod{q}.$$

The tenth step of the method is forming the cryptographic digital signature as (K*,s).

The eleventh step of the present method is acquiring, by a verifier, the finite field, the elliptic curve, the point P, the point W, the message M, and the cryptographic digital signature (K*,s).

The twelfth step of the method is computing, by the verifier, $h_1$ and c.

The thirteenth step of the method is selecting a pair of components $(n_0, n_1)$ from the following pairs of components:

$$(n_0, n_1) = (sc^{-1} \pmod{q}, -h_1 c^{-1} \pmod{q}),$$

$$(n_0, n_1) = (cs^{-1} \pmod{q}, h_1 s^{-1} \pmod{q}) \text{ and}$$

$$(n_0, n_1) = (-ch_1^{-1} \pmod{q}, sh_1^{-1} \pmod{q}).$$

The fourteenth step of the method is generating the point $n_0 P$ via coefficient splitting.

The fifteenth step of the method is generating the point $n_1 W$ via coefficient splitting.

The sixteenth step of the method is summing the point computed in the fourteenth step and the point computed in the fifteenth step and designating the sum Q.

The seventeenth step of the method is transforming Q to Q*.

The eighteenth, and last, step of the method is verifying the cryptographic digital signature (K*,s) if Q*=K*. Otherwise rejecting the cryptographic digital signature (K*,s) as unverified.

DETAILED DESCRIPTION

The present invention is a method of generating and verifying a cryptographic digital signature using coefficient splitting in order to minimize the number of elliptic curve operations required to generate and verify a digital signature. The present invention applies to two classes of elliptic curves. For illustrative purposes, the present invention is described for two different digital signature methods. However, the present invention may be applied to any suitable digital signature method.

Figure 1:
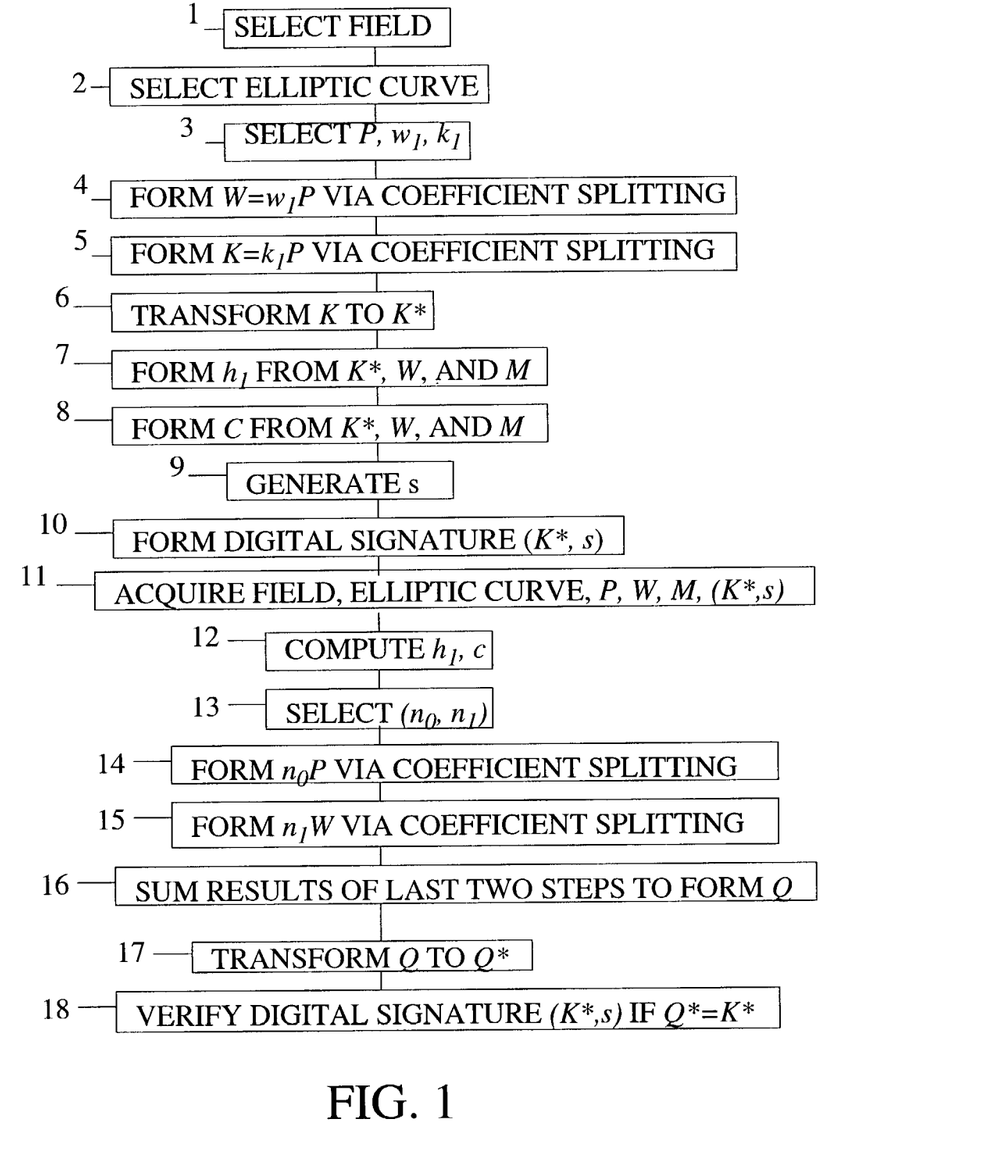
FIG. 1 is a list of steps of a first digital signature method of the present invention.

FIG. 1 is a list of steps of the present method for a first cryptographic digital signature and verification method. The first step 1, of the present method is selecting, by a signer, a finite field F.

The second step 2 of the present method is selecting, by the signer, an elliptic curve E. The elliptic curve is defined over a field of integers modulo p and is divisible by a prime number q. These quantities must be known by the signer and a verifier. The elliptic curve is selected from a group of elliptic curves consisting of a first type and a second type.

A first type of elliptic curve is defined by $$y^2 = x^3 + A^* x \pmod{p},$$

where A is an integer modulo p, and there exists a number w and integers h and k such that, if (x,y) is a point on the curve for which q*(x,y) is the identity point O, then $$(2\hat{\ }d)^*(x,y) = k^*(x,y) + h^*(-x, w^* y).$$

A second type of elliptic curve is defined by $$y^2 = x^3 + B \pmod{p},$$

where B is an integer modulo p, and there exists a number w and integers h and k such that, if (x,y) is a point on the curve for which q*(x,y) is the identity point O, then $$(2\hat{\ }d)^*(x,y) = k^*(x,y) + h^*(w^* x, y).$$

The third step 3 of the present method is selecting, by the signer, a point P, an integer $w_1$, and an integer $k_1$.

Figure 2:
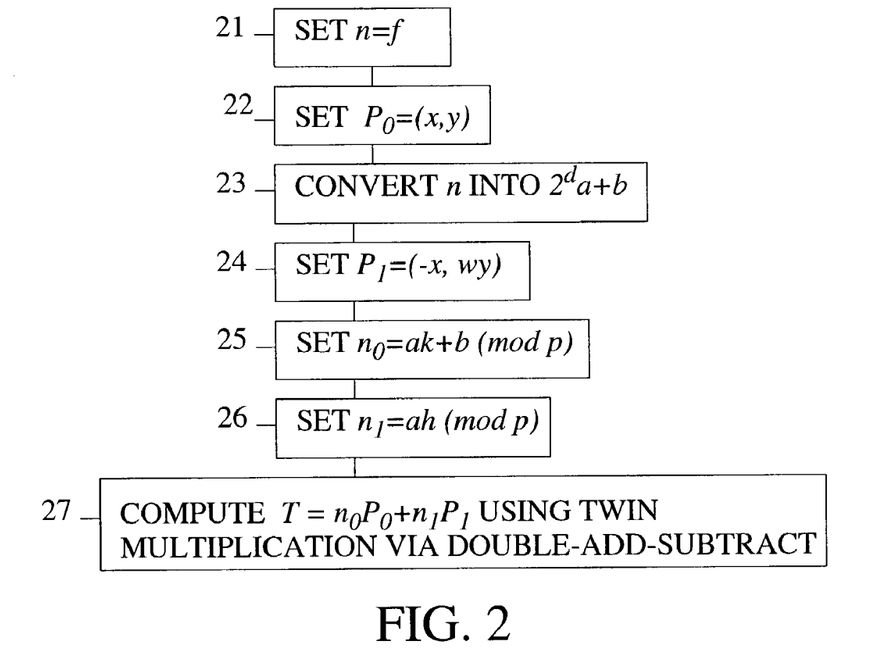
FIG. 2 is a list of steps for performing coefficient splitting when the a first type of elliptic curve is selected.
Figure 3:
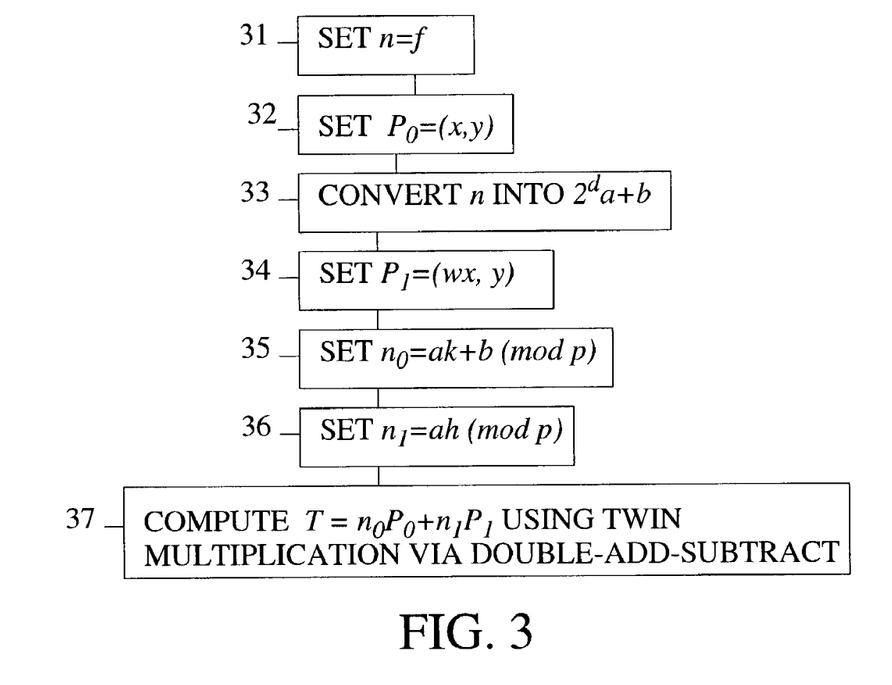
FIG. 3 is a list of steps for performing coefficient splitting when a second type of elliptic curve is selected.

The fourth step 4 of the present method is generating, by the signer, a point $W = w_1 P$ via coefficient splitting. The steps for performing coefficient splitting are listed in FIG. 2 and FIG. 3 described below, depending on the type of elliptic curve selected. The steps of FIG. 2 are used when the first type of elliptic curve is selected, and the steps of FIG. 3 are used when the second type of elliptic curve is selected. The steps of FIG. 2 or FIG. 3, depending on the type of elliptic curve is selected, apply to each step in the present invention that calls for coefficient splitting.

The fifth step 5 of the present method of FIG. 1 is generating, by the signer, a point $K=k_1P$ via coefficient splitting.

The sixth step 6 of the present method is transforming, by the signer, K to a bit string K*.

The seventh step 7 of the present method is combining, by the signer, K*, W, and a message M in a first manner to produce $h_1$, where $h_1$ is an integer modulo q.

The eighth step 8 of the present invention is combining, by the signer, K*, W, and the message M in a second manner to produce c, where c is an integer modulo q.

The ninth step 9 of the present method is generating, by the signer, s using one of the following equations:

$$s=h_1w_1+ck_1 \; (\bmod \; q),$$

$$s=(h_1w_1+c)/k_1 \; (\bmod \; q), \text{ and}$$

$$s=(h_1k_1+c)/w_1 \; (\bmod \; q).$$

The tenth step 10 of the present method is forming, by the signer, the cryptographic digital signature as (K*,s).

The eleventh step 11 of the present method is acquiring, by the verifier, the finite field, the elliptic curve, the point P, the point W, the message M, and the cryptographic digital signature (K*,s).

The twelfth step 12 of the present method is computing, by the verifier, $h_1$ and c in the same manner as the signer did in the seventh step 7 and the eighth step, respectively.

The thirteenth step 13 of the present method is selecting, by the verifier, a pair of components ($n_0$, $n_1$). The pairs of components ($n_0$, $n_1$) are selected from the following groups of pairs of components:

$$(n_0,n_1)=(sc^{-1} \; (\bmod \; q), -h_1c^{-1} \; (\bmod \; q)),$$

$$(n_0,n_1)=(cs^{-1} \; (\bmod \; q), h_1s^{-1} \; (\bmod \; q)) \text{ and}$$

$$(n_0,n_1)=(-ch_1^{-1} \; (\bmod \; q), sh_1^{-1} \; (\bmod \; q)),$$

where the pair of components selected corresponds according to position to the equation selected in the ninth step 9. For example, if the first equation was selected in the ninth step 9 then the first pair of coefficients are selected in the thirteenth step 13.

The fourteenth step 14 of the present method is generating, by the verifier, the point $n_0P$ via coefficient splitting.

The fifteenth step 15 of the present method is generating, by the verifier, the point $n_1W$ via coefficient splitting.

The sixteenth step 16 of the present method is summing, by the verifier, the point computed in the fourteenth step 14 and the point computed in the fifteenth step 15 and designating the sum Q.

The seventeenth step 17 of the present method is transforming, by the verifier, Q to Q* in the same manner as K was transformed to K* in the sixth step 6.

The eighteenth, and last, step 18 of the present method is verifying the cryptographic digital signature (K*,s) if Q*=K*. Otherwise rejecting the cryptographic digital signature (K*,s) as unverified.

FIG. 2 lists the steps for performing coefficient splitting every time such a step is called for in the present invention where the first type of elliptic curve is selected. Here, the variable T is used in FIG. 2 to represent the scalar multiple to be computed (i.e., $w_1P$, $k_1P$, $n_0P$, or $n_1W$). The coefficient being split (i.e., $w_1$, $k_1$, $n_0$, or $n_1$) is represented by the variable f. The first step of the coefficient splitting method 21 is setting n=f.

The second step 22 of the coefficient splitting method is setting $P_0=(x,y)$, where (x,y) are coordinates of point P.

The third step 23 of the coefficient splitting method is converting n into the form $2^da+b$, where a and b are integers.

The fourth step 24 of the coefficient splitting method is setting $P_1=(-x, wy)$.

The fifth step 25 of the coefficient splitting method is setting $n_0=ak+b \; (\bmod \; p)$.

The sixth step 26 of the coefficient setting $n_1=ah \; (\bmod \; p)$.

The seventh, and last, step 27 of the coefficient splitting method is computing $T=n_0P_0+n_1P_1$ using twin multiplication via a double-add-subtract method.

FIG. 3 lists the steps for performing coefficient splitting every time such a step is called for in the present invention where the second type of elliptic curve is selected. Here, the variable T is used in FIG. 3 to represent the scalar multiple to be computed (i.e., $w_1P$, $k_1P$, $n_0P$, or $n_1W$). The coefficient being split (i.e., $w_1$, $k_1$, $n_0$, or $n_1$) is represented by the variable f. The first step of the coefficient splitting method 31 is setting n=f.

The second step 32 of the coefficient splitting method is setting $P_0=(x,y)$, where (x,y) are coordinates of point P.

The third step 33 of the coefficient splitting method is converting n into the form $2^da+b$, where a and b are integers.

The fourth step 34 of the coefficient splitting method is setting $P_1=(wx, y)$.

The fifth step 35 of the coefficient splitting method is setting $n_0=ak+b \; (\bmod \; p)$.

The sixth step 36 of the coefficient setting $n_1=ah \; (\bmod \; p)$.

The seventh, and last, step 27 of the coefficient splitting method is computing $T=n_0P_0+n_1P_1$ using twin multiplication via a double-add-subtract method. Twin multiplication and the double-add-subtract method are described in the background section above.

Figure 4:
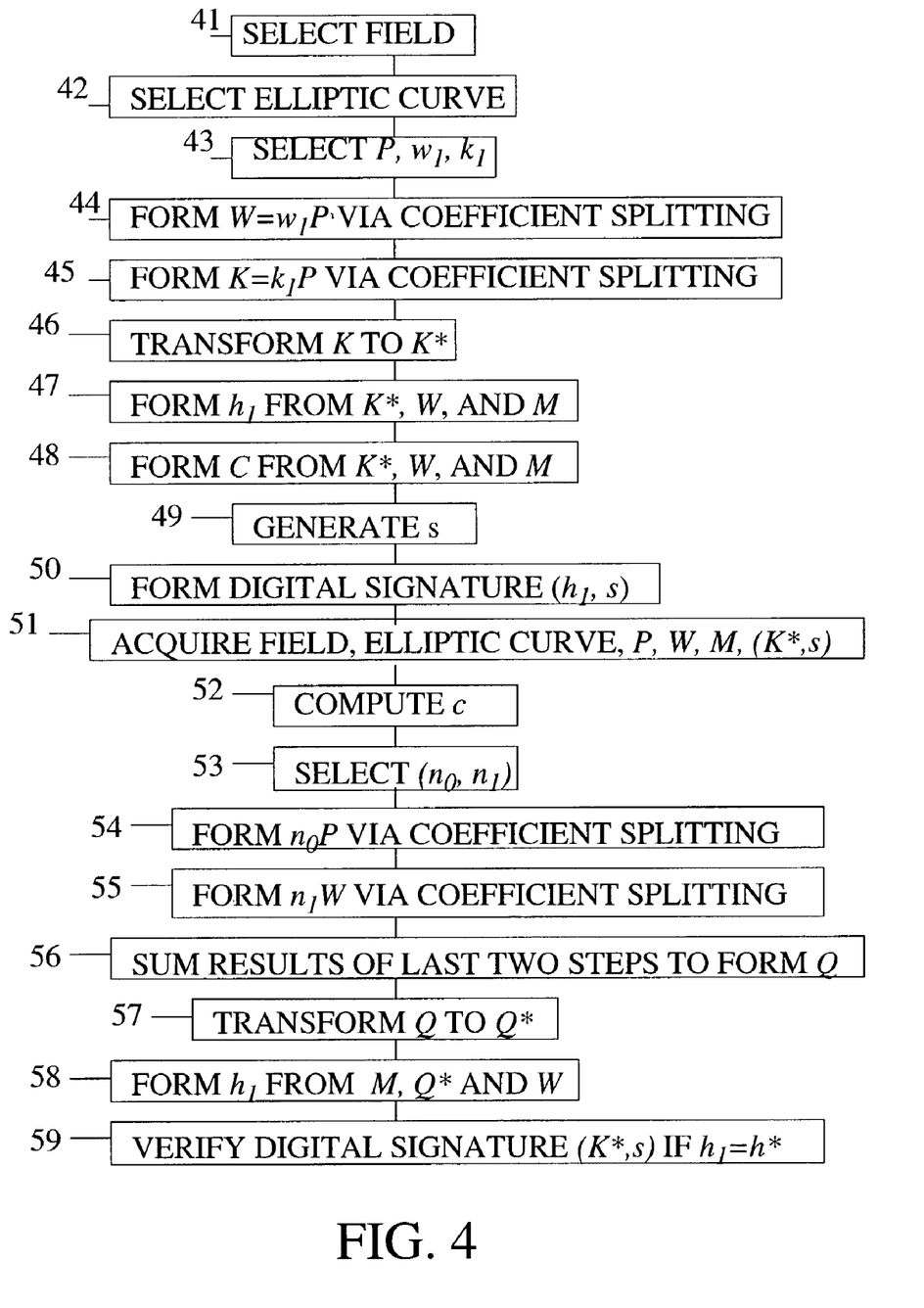
FIG. 4 is a list of steps of a second digital signature method of the present invention.

FIG. 4 is a list of steps for generating and verifying a cryptographic digital signature using coefficient splitting using a second type of digital signature method. The first step 41 of the second digital signature method is selecting, by a signer, a finite field F.

The second step 42 of the second digital signature method is selecting, by the signer, an elliptic curve E. The elliptic curve is defined over a field of integers modulo p and divisible by a prime number q, known by the signer and a verifier. The elliptic curve is selected from a first type and a second type of elliptic curve.

An elliptic curve of the first type is defined by $$y^2=x^3+A^*x \; (\bmod \; p),$$

where A is an integer modulo p, and there exists a number w and integers h and k such that, if (x,y) is a point on the curve for which q*(x,y) is the identity point O, then $$(2^\hat{}d)^*(x,y)=k^*(x,y)+h^*(-x, w^*y).$$

An elliptic curve of the second type is defined by $$y^2=x^3+B \; (\bmod \; p),$$

where B is an integer modulo p, and there exists a number w and integers h and k such that, if (x,y) is a point on the curve for which q*(x,y) is the identity point O, then $$(2^\hat{}d)^*(x,y)=k^*(x,y)+h^*(w^*x,y).$$

The third step 43 of the second digital signature method is selecting, by the signer, a point P, an integer $w_1$, and an integer $k_1$.

The fourth step 44 of the second digital signature method is generating, by the signer, a point $W=w_1P$ via coefficient splitting. Each occurrence of the coefficient splitting step in the second digital signature method of FIG. 4 is performed as described in FIG. 2 and FIG. 3 above, depending on the type of elliptic curve selected.

The fifth step 45 of the second digital signature method is generating, by the signer, a point $K=k_1P$ via coefficient splitting.

The sixth step 46 of the second digital signature method is transforming, by the signer, K to a bit string K*.

The seventh step 47 of the second digital signature method is combining, by the signer, K*, W, and a message M in a first manner to produce $h_1$, where $h_1$ is an integer modulo q.

The eighth step 48 of the second digital signature method is combining, by the signer, K*, W, and the message M in a second manner to produce c, where c is an integer modulo q.

The ninth step 49 of the second digital signature method is generating, by the signer, s using one of the following equations:

$$s=h_1w_1+ck_1 \pmod{q},$$

$$s=(h_1w_1+c)/k_1 \pmod{q}, \text{ and}$$

$$s=(h_1k_1+c)/w_1 \pmod{q}.$$

The tenth step 50 of the second digital signature method is forming, by the signer, the cryptographic digital signature as $(h_1,s)$.

The eleventh step 51 of the second digital signature method is acquiring, by the verifier, the finite field, the elliptic curve, the point P, the point W, the message M, and the cryptographic digital signature $(h_1,s)$.

The twelfth step 52 of the second digital signature method is computing, by the verifier, c in the same manner as the signer did in the eighth step 48.

The thirteenth step 53 of the second digital signature method is selecting, by the verifier, a pair of components $(n_0, n_1)$ from the following equations:

$$(n_0,n_1)=(sc^{-1} \pmod{q}, -h_1c^{-1} \pmod{q}),$$

$$(n_0,n_1)=(cs^{-1} \pmod{q}, h_1s^{-1} \pmod{q}), \text{ and}$$

$$(n_0,n_1)=(-ch_1^{-1} \pmod{q}, sh_1^{-1} \pmod{q}),$$

where the pair of components selected corresponds according to position to the equation selected in the ninth step 49.

The fourteenth step 54 of the second digital signature method is generating, by the verifier, the point $n_0P$ via coefficient splitting.

The fifteenth step 55 of the second digital signature method is generating, by the verifier, the point $n_1W$ via coefficient splitting.

The sixteenth step 56 of the second digital signature method is summing, by the verifier, the point computed in the fourteenth step 54 and the point computed in the fifteenth step 55 and designating the sum Q.

The seventeenth step 57 of the second digital signature method is transforming, by the verifier, Q to Q* in the same manner as K was transformed to K* in the sixth step 46.

The eighteenth step 58 of the second digital signature method is combining M, Q*, and W to produce h* in the same manner as M, K*, and W were combined in the seventh step 47.

The nineteenth, and last, step 59 of the second digital signature method is verifying the cryptographic digital signature $(h_1,s)$ if $h_1=h^*$. Otherwise rejecting the cryptographic digital signature $(h_1,s)$ as unverified.

What is claimed is:

1. A method of generating and verifying a cryptographic digital signature using coefficient splitting, comprising the steps of:
   a) selecting, by a signer, a finite field;
   b) selecting, by the signer, an elliptic curve, where the elliptic curve is defined over a field of integers modulo p and divisible by a prime number q, known by the signer and a verifier, and where the elliptic curve is selected from a group of elliptic curves consisting of a first type and a second type; where the elliptic curves of the first type are defined by $y^2=x^3+A*x \pmod{p}$, where A is an integer modulo p, and there exists a number w and integers h and k such that, if (x,y) is a point on the curve for which $q^*(x,y)$ is the identity point O, then $(2^{\wedge}d)^*(x,y)=k^*(x,y)+h^*(-x,w^*y)$; where the elliptic curves of the second type are defined by $y^2=x^3+B \pmod{p}$, where B is an integer modulo p, and there exists a number w and integers h and k such that, if (x,y) is a point on the curve for which $q^*(x,y)$ is the identity point O, then $(2^{\wedge}d)^*(x,y)=k^*(x,y)+h^*(w^*x,y)$;
   c) selecting, by the signer, a point P, an integer $w_1$, and an integer $k_1$;
   d) generating, by the signer, a point $W=w_1P$ via coefficient splitting;
   e) generating, by the signer, a point $K=k_1P$ via coefficient splitting;
   f) transforming, by the signer, K to a bit string K*;
   g) combining, by the signer, K*, W, and a message M in a first manner to produce $h_1$, where $h_1$ is an integer modulo q;
   h) combining, by the signer, K*, W, and the message M in a second manner to produce c, where c is an integer modulo q;
   i) generating, by the signer, s using an equation selected from the group of equations consisting of $s=h_1w_1+ck_1 \pmod{q}$, $s=(h_1w_1+c)/k_1 \pmod{q}$, and $s=(h_1k_1+c)/w_1 \pmod{q}$;
   j) forming, by the signer, the cryptographic digital signature as (K*,s);
   k) acquiring, by the verifier, the finite field, the elliptic curve, the point P, the point W, the message M, and the cryptographic digital signature (K*,s);
   l) computing, by the verifier, $h_1$ and c in the same manner as the signer did in step (g) and step (h), respectively;
   m) selecting, by the verifier, a pair of components $(n_0, n_1)$ from the group of pairs of components consisting of $(sc^{-1} \pmod{q}, -h_1c^{-1} \pmod{q})$, $(cs^{-1} \pmod{q}, h_1s^{-1} \pmod{q})$ and $(-ch_1^{-1} \pmod{q}, sh_1^{-1} \pmod{q})$, where the pair of components selected corresponds according to position to the equation selected in step (i);
   n) generating, by the verifier, the point $n_0P$ via coefficient splitting;
   o) generating, by the verifier, the point $n_1W$ via coefficient splitting;
   p) summing, by the verifier, the point computed in step (n) and the point computed in the step (o) and designating the sum Q;

q) transforming, by the verifier, Q to Q* in the same manner as K was transformed to K* in step (f); and r) verifying the cryptographic digital signature (K*,s) if Q*=K*, otherwise rejecting the cryptographic digital signature (K*,s) as unverified.

2. The method of claim 1, wherein the step of generating, by the signer, $w_1P$ via coefficient splitting, if an elliptic curve of the first type was selected in step (b), is comprised of the steps of:
   a) setting $n=w_1$;
   b) setting $P_0=(x,y)$, where (x,y) are coordinates of point P;
   c) converting n into the form $2^d a+b$, where a and b are integers;
   d) setting $P_1=(-x, wy)$;
   e) setting $n_0=ak+b$ (mod p);
   f) setting $n_1=ah$ (mod p); and
   g) computing $w_1P=n_0P_0+n_1P_1$ using twin multiplication via a double-add-subtract method.

3. The method of claim 1, wherein the step of generating, by the signer, $w_1P$ via coefficient splitting, if an elliptic curve of the second type was selected in step (b), is comprised of the steps of:
   a) setting $n=w_1$;
   b) setting $P_0=(x,y)$, where (x,y) are coordinates of point P;
   c) converting n into the form $2^d a+b$, where a and b are integers;
   d) setting $P_1=(wx, y)$;
   e) setting $n_0=ak+b$ (mod p);
   f) setting $n_1=ah$ (mod p); and
   g) computing $w_1P=n_0P_0+n_1P_1$ using twin multiplication via a double-add-subtract method.

4. The method of claim 1, wherein the step of generating, by the signer, $k_1P$ via coefficient splitting, if an elliptic curve of the first type was selected in step (b), is comprised of the steps of:
   a) setting $n=k_1$;
   b) setting $P_0=(x,y)$, where (x,y) are coordinates of point P;
   c) converting n into the form $2^d a+b$, where a and b are integers;
   d) setting $P_1=(-x, wy)$;
   e) setting $n_0=ak+b$ (mod p);
   f) setting $n_1=ah$ (mod p); and
   g) computing $k_1P=n_0P_0+n_1P_1$ using twin multiplication via a double-add-subtract method.

5. The method of claim 1, wherein the step of generating, by the signer, $k_1P$ via coefficient splitting, if an elliptic curve of the second type was selected in step (b), is comprised of the steps of:
   a) setting $n=k_1$;
   b) setting $P_0=(x,y)$, where (x,y) are coordinates of point P;
   c) converting n into the form $2^d a+b$, where a and b are integers;
   d) setting $P_1=(wx, y)$;
   e) setting $n_0=ak+b$ (mod p);
   f) setting $n_1=ah$ (mod p); and
   g) computing $k_1P=n_0P_0+n_1P_1$ using twin multiplication via a double-add-subtract method.

6. The method of claim 1, wherein the step of generating, by the verifier, $n_0P$ via coefficient splitting, if an elliptic curve of the first type was selected in step (b), is comprised of the steps of:
   a) setting $n=n_0$;
   b) setting $P_0=(x,y)$, where (x,y) are coordinates of point P;
   c) converting n into the form $2^d a+b$, where a and b are integers;
   d) setting $P_1=(-x, wy)$;
   e) setting $n_0^*=ak+b$ (mod p);
   f) setting $n_1^*=ah$ (mod p); and
   g) computing $n_0P=n_0^*P_0+n_1^*P_1$ using twin multiplication via a double-add-subtract method.

7. The method of claim 1, wherein the step of generating, by the verifier, $n_0P$ via coefficient splitting, if an elliptic curve of the second type was selected in step (b), is comprised of the steps of:
   a) setting $n=n_0$;
   b) setting $P_0=(x,y)$, where (x,y) are coordinates of point P;
   c) converting n into the form $2^d a+b$, where a and b are integers;
   d) setting $P_1=(wx, y)$;
   e) setting $n_0^*=ak+b$ (mod p);
   f) setting $n_1^*=ah$ (mod p); and
   g) computing $n_0P=n_0^*P_0+n_1^*P_1$ using twin multiplication via a double-add-subtract method.

8. The method of claim 1, wherein the step of generating, by the verifier, $n_1W$ via coefficient splitting, if an elliptic curve of the first type was selected in step (b), is comprised of the steps of:
   a) setting $n=n_1$;
   b) setting $P_0=(x,y)$, where (x,y) are coordinates of point W;
   c) converting n into the form $2^d a+b$, where a and b are integers;
   d) setting $P_1=(-x, wy)$;
   e) setting $n_0^*=ak+b$ (mod p);
   f) setting $n_1^*=ah$ (mod p); and
   g) computing $n_1W=n_0^*P_0+n_1^*P_1$ using twin multiplication via a double-add-subtract method.

9. The method of claim 1, wherein the step of generating, by the verifier, $n_1W$ via coefficient splitting, if an elliptic curve of the second type was selected in step (b), is comprised of the steps of:
   a) setting $n=n_1$;
   b) setting $P_0=(x,y)$, where (x,y) are coordinates of point W;
   c) converting n into the form $2^d a+b$, where a and b are integers;
   d) setting $P_1=(wx, y)$;
   e) setting $n_0^*=ak+b$ (mod p);
   f) setting $n_1^*=ah$ (mod p); and
   g) computing $n_1W=n_0^*P_0+n_1^*P_1$ using twin multiplication via a double-add-subtract method.

10. A method of generating and verifying a cryptographic digital signature using coefficient splitting, comprising the steps of:
   a) selecting, by a signer, a finite field;
   b) selecting, by the signer, an elliptic curve, where the elliptic curve is defined over a field of integers modulo p and divisible by a prime number q, known by the signer and a verifier, and where the elliptic curve is selected from a group of elliptic curves consisting of a first type and a second type; where the elliptic curves of the first type are defined by $y^2=x^3+A*x$ (mod p), where A is an integer modulo p, and there exists a number w and integers h and k such that, if (x,y) is a point on the curve for which $q*(x,y)$ is the identity point O, then $(2^d)*(x,y)=k*(x,y)+h*(-x,w*y)$; where the elliptic curves of the second type are defined by $y^2=x^3+B$ (mod p), where B is an integer modulo p, and there exists a number w and integers h and k such that, if (x,y) is a point on the curve for which $q*(x,y)$ is the identity point O, then $(2^d)*(x,y)=k*(x,y)+h*(w*x,y)$;
   c) selecting, by the signer, a point P, an integer $w_1$; and an integer $k_1$;

d) generating, by the signer, a point $W=w_1P$ via coefficient splitting;
e) generating, by the signer, a point $K=k_1P$ via coefficient splitting;
f) transforming, by the signer, K to a bit string $K^*$;
g) combining, by the signer, $K^*$, W, and a message M in a first manner to produce $h_1$, where $h_1$ is an integer modulo q;
h) combining, by the signer, $K^*$, W, and the message M in a second manner to produce c, where c is an integer modulo q;
i) generating, by the signer, s using an equation selected from the group of equations consisting of $s=h_1w_1+ck_1$ (mod q), $s=(h_1w_1+c)/k_1$ (mod q), and $s=(h_1k_1+c)/w_1$ (mod q);
j) forming, by the signer, the cryptographic digital signature as $(h_1,s)$;
k) acquiring, by the verifier, the finite field, the elliptic curve, the point P, the point W, the message M, and the cryptographic digital signature $(h_1,s)$;
l) computing, by the verifier, c in the same manner as the signer did in step (h);
m) selecting, by the verifier, a pair of components $(n_0, n_1)$ from the group of pairs of components consisting of $(sc^{-1} \pmod q, -h_1c^{-1} \pmod q)$, $(cs^{-1} \pmod q, h_1s^{-1} \pmod q)$ and $(-ch_1^{-1} \pmod q, sh_1^{-1} \pmod q)$, where the pair of components selected corresponds according to position to the equation selected in step (i);
n) generating, by the verifier, the point $n_0P$ via coefficient splitting;
o) generating, by the verifier, the point $n_1W$ via coefficient splitting;
p) summing, by the verifier, the point computed in step (n) and the point computed in the step (o) and designating the sum Q;
q) transforming, by the verifier, Q to $Q^*$ in the same manner as K was transformed to $K^*$ in step (f);
r) combining M, $Q^*$, and W to produce $h^*$ in the same manner as M, $K^*$, and W were combined in step (g); and
s) verifying the cryptographic digital signature $(h_1,s)$ if $h_1=h^*$, otherwise rejecting the cryptographic digital signature $(h_1,s)$ as unverified.

11. The method of claim 10, wherein the step of generating, by the signer, $w_1P$ via coefficient splitting, if an elliptic curve of the first type was selected in step (b), is comprised of the steps of:
a) setting $n=w_1$;
b) setting $P_0=(x,y)$, where (x,y) are coordinates of point P;
c) converting n into the form $2^da+b$, where a and b are integers;
d) setting $P_1=(-x, wy)$;
e) setting $n_0=ak+b \pmod p$;
f) setting $n_1=ah \pmod p$; and
g) computing $w_1P=n_0P_0+n_1P_1$ using twin multiplication via a double-add-subtract method.

12. The method of claim 10, wherein the step of generating, by the signer, $w_1P$ via coefficient splitting, if an elliptic curve of the second type was selected in step (b), is comprised of the steps of:
a) setting $n=w_1$;
b) setting $P_0=(x,y)$, where (x,y) are coordinates of point P;
c) converting n into the form $2^da+b$, where a and b are integers;
d) setting $P_1=(wx, y)$;
e) setting $n_0=ak+b \pmod p$;
f) setting $n_1=ah \pmod p$; and
g) computing $w_1P=n_0P_0+n_1P_1$ using twin multiplication via a double-add-subtract method.

13. The method of claim 10, wherein the step of generating, by the signer, $k_1P$ via coefficient splitting, if an elliptic curve of the first type was selected in step (b), is comprised of the steps of:
a) setting $n=k_1$;
b) setting $P_0=(x,y)$, where (x,y) are coordinates of point P;
c) converting n into the form $2^da+b$, where a and b are integers;
d) setting $P_1=(-x, wy)$;
e) setting $n_0=ak+b \pmod p$;
f) setting $n_1=ah \pmod p$; and
g) computing $k_1P=n_0P_0+n_1P_1$ using twin multiplication via a double-add-subtract method.

14. The method of claim 10, wherein the step of generating, by the signer, $k_1P$ via coefficient splitting, if an elliptic curve of the second type was selected in step (b), is comprised of the steps of:
a) setting $n=k_1$;
b) setting $P_0=(x,y)$, where (x,y) are coordinates of point P;
c) converting n into the form $2^da+b$, where a and b are integers;
d) setting $P_1=(wx, y)$;
e) setting $n_0=ak+b \pmod p$;
f) setting $n_1=ah \pmod p$; and
g) computing $k_1P=n_0P_0+n_1P_1$ using twin multiplication via a double-add-subtract method.

15. The method of claim 10, wherein the step of generating, by the verifier, $n_0P$ via coefficient splitting, if an elliptic curve of the first type was selected in step (b), is comprised of the steps of:
a) setting $n=n_0$;
b) setting $P_0=(x,y)$, where (x,y) are coordinates of point P;
c) converting n into the form $2^da+b$, where a and b are integers;
d) setting $P_1=(-x, wy)$;
e) setting $n_0^*=ak+b \pmod p$;
f) setting $n_1^*=ah \pmod p$; and
g) computing $n_0P=n_0^*P_0+n_1^*P_1$ using twin multiplication via a double-add-subtract method.

16. The method of claim 10, wherein the step of generating, by the verifier, $n_0P$ via coefficient splitting, if an elliptic curve of the second type was selected in step (b), is comprised of the steps of:
a) setting $n=n_0$;
b) setting $P_0=(x,y)$, where (x,y) are coordinates of point P;
c) converting n into the form $2^da+b$, where a and b are integers;
d) setting $P_1=(wx, y)$;
e) setting $n_0^*=ak+b \pmod p$;
f) setting $n_1^*=ah \pmod p$; and
g) computing $n_0P=n_0^*P_0+n_1^*P_1$ using twin multiplication via a double-add-subtract method.

17. The method of claim 10, wherein the step of generating, by the verifier, $n_1W$ via coefficient splitting, if an elliptic curve of the first type was selected in step (b), is comprised of the steps of:
a) setting $n=n_1$;
b) setting $P_0=(x,y)$, where (x,y) are coordinates of point W;
c) converting n into the form $2^da+b$, where a and b are integers;
d) setting $P_1=(-x, wy)$;
e) setting $n_0^*=ak+b \pmod p$;
f) setting $n_1^*=ah \pmod p$; and g) computing $n_1 W = n_0 * P_0 + n_1 * P_1$ using twin multiplication via a double-add-subtract method.

18. The method of claim 10, wherein the step of generating, by the verifier, $n_1 W$ via coefficient splitting, if an elliptic curve of the second type was selected in step (b), is comprised of the steps of:

a) setting $n = n_1$;
b) setting $P_0 = (x,y)$, where $(x,y)$ are coordinates of point W;
c) converting n into the form $2^d a + b$, where a and b are integers;
d) setting $P_1 = (wx, y)$;
e) setting $n_0^* = ak + b \pmod{p}$;
f) setting $n_1^* = ah \pmod{p}$; and
g) computing $n_1 W = n_0 * P_0 + n_1 * P_1$ using twin multiplication via a double-add-subtract method.

* * * * *